United States Patent
Lee et al.

(10) Patent No.: US 10,375,760 B2
(45) Date of Patent: Aug. 6, 2019

(54) METHOD AND APPARATUS FOR NOTIFYING A USER THAT A DEVICE NEEDS TO BE CLEANED AND/OR SERVICED

(71) Applicant: MOTOROLA SOLUTIONS, INC, Chicago, IL (US)

(72) Inventors: Geng Xiang Lee, Bayan Lepas (MY); Anoop Sehgal Paras Ram, Ipoh (MY); Bing Qin Lim, Jelutong (MY); Rm Muthaiah Ramanathan, Bayan Lepas (MY); Chun Meng Tan, Kulim (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/618,176

(22) Filed: Jun. 9, 2017

(65) Prior Publication Data

US 2018/0359808 A1  Dec. 13, 2018

(51) Int. Cl.
| | |
|---|---|
| *H04W 84/18* | (2009.01) |
| *H04M 3/42* | (2006.01) |
| *H04W 24/04* | (2009.01) |
| *H04W 88/02* | (2009.01) |
| *H04W 84/08* | (2009.01) |

(52) U.S. Cl.
CPC .............. *H04W 84/18* (2013.01); *H04M 3/42* (2013.01); *H04W 24/04* (2013.01); *H04W 84/08* (2013.01); *H04W 88/02* (2013.01)

(58) Field of Classification Search
CPC ........ H04W 84/18; H04W 88/02; H04M 3/42
See application file for complete search history.

(56) References Cited

U.S. PATENT DOCUMENTS

| | | | |
|---|---|---|---|
| 9,543,998 B2* | 1/2017 | Honjo | H04B 1/38 |
| 9,774,410 B2* | 9/2017 | Daoura | H04W 40/22 |
| 10,003,944 B2* | 6/2018 | Choi | H04W 4/02 |
| 10,102,507 B2* | 10/2018 | Buchbinder | G06Q 10/20 |
| 2005/0232242 A1* | 10/2005 | Karaoguz | H04L 12/2805 370/352 |
| 2009/0264070 A1* | 10/2009 | Lim | G06Q 30/0261 455/41.2 |
| 2011/0225238 A1* | 9/2011 | Shaffer | H04L 63/08 709/204 |
| 2013/0204484 A1* | 8/2013 | Ricci | G06F 17/00 701/29.4 |
| 2013/0337789 A1* | 12/2013 | Johnson | H04W 4/02 455/414.1 |
| 2014/0368601 A1* | 12/2014 | deCharms | H04W 4/021 348/14.02 |
| 2015/0227463 A1* | 8/2015 | Byers | G06F 16/9574 711/137 |
| 2016/0088455 A1* | 3/2016 | Bozik | H04W 4/90 370/225 |

* cited by examiner

*Primary Examiner* — Qun Shen

(57) ABSTRACT

A method and apparatus for notifying a user that a device needs to be serviced is provided herein. During operation, a device will determine that at least the first device has been serviced or needs to be serviced. When this occurs, the device will determine members of a personal-area-network (PAN) that includes/included the first device, and notify a user that the PAN members should be serviced as well.

6 Claims, 4 Drawing Sheets

METHOD AND APPARATUS FOR NOTIFYING A USER THAT A DEVICE NEEDS TO BE CLEANED AND/OR SERVICED

BACKGROUND OF THE INVENTION

A problem exists in that equipment used by first responders often needs to be cleaned or serviced in order to function properly. Oftentimes the amount of equipment on scene will make it difficult to remember to clean and/or service all necessary equipment. Therefore a need exists for a method and apparatus for notifying a user that a device needs to be cleaned or serviced in order to reduce the possibility that the equipment will malfunction.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for notifying a user that a device needs to be serviced is provided herein. During operation, a device will determine that at least the first device has been serviced or needs to be serviced. When this occurs, the device will determine members of a personal-area-network (PAN) that includes/included the first device, and notify a user that the PAN members should be serviced as well.

Servicing PAN members after the first device is serviced reduces chances that a PAN-member device will malfunction since all PAN members were exposed to a similar environment. Therefore, the servicing of one member of the PAN indicates that other members of the PAN should be serviced as well.

Figure 1:
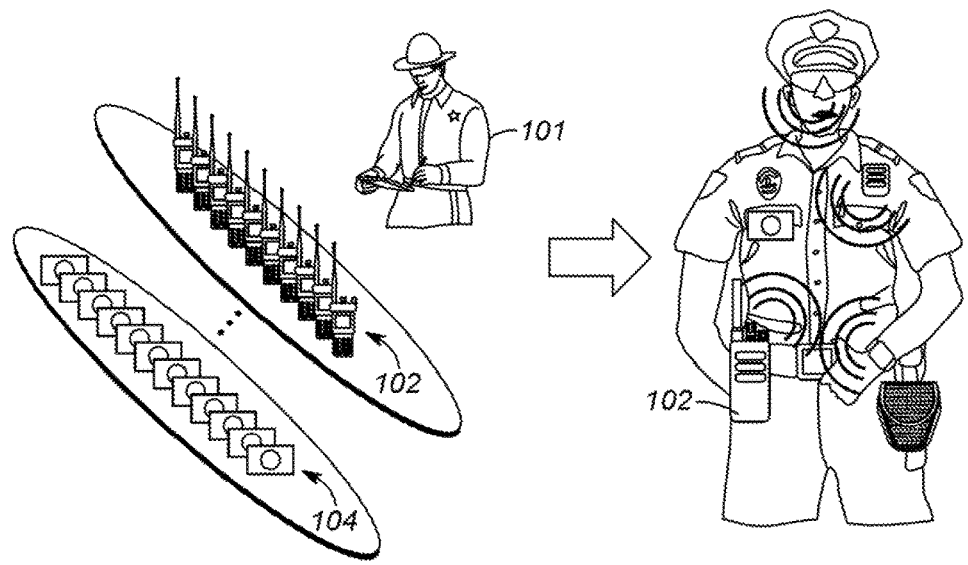
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch operator so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, . . . , etc. All devices pulled by the officer will be configured to form a PAN by associating (pairing) with each other and communicating wirelessly among the devices.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Many communication devices comprise digital assistants that can provide users with valuable information. The information provided to a user can be based on questions posed by the user or based on other triggers. For example, digital assistants, such as Siri provided by Apple, Inc.® and Google Now provided by Google, Inc.®, are software applications that understand natural language, and complete electronic tasks in response to user voice inputs. At least one device worn by the officer may comprise a digital assistant. These digital assistants take dictation, read a text message or an e-mail message, look up phone numbers, anticipate requests, place calls, generate reminders, warn users, and provide many types of other information. For example, radio 102 may be configured with a digital assistant application (not shown in FIG. 1). As described above, the digital assistant application may receive a user-initiated query through audio data (i.e., a spoken query), text data (i.e., a written or typed query), or a combination thereof. Additionally, the digital assistant application may receive data from other devices via the PAN (such as a device has been serviced), and provide necessary information to the officer based on the received data.

Figure 2:
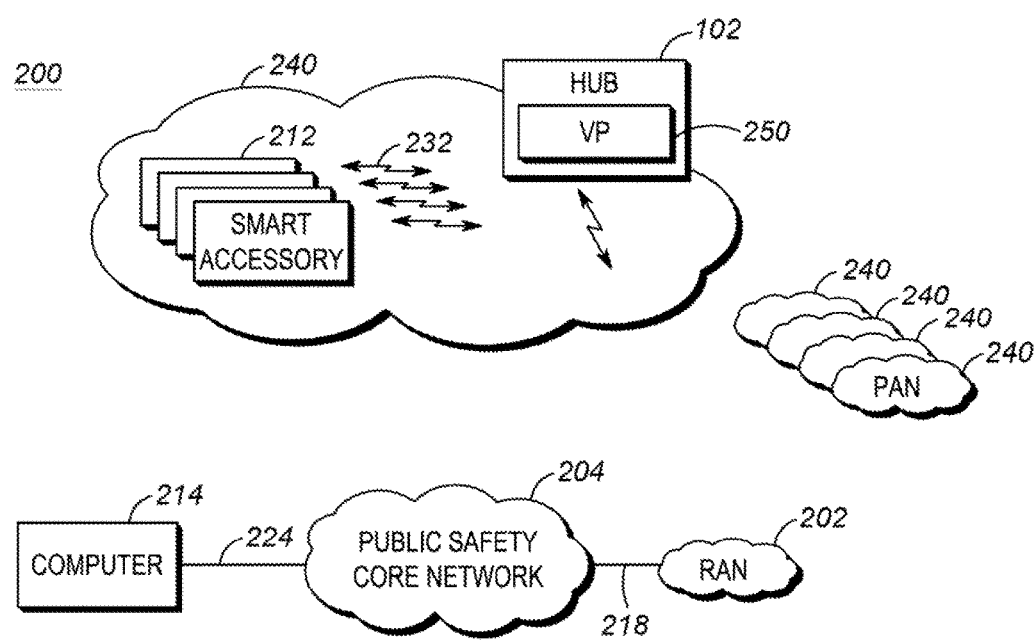
FIG. 2 depicts an example communication system that incorporates a personal-area network and a digital assistant.

FIG. 2 depicts an example communication system 200 that incorporates PANs created as described above along with a digital assistant. System 200 includes one or more radio access networks (RANs) 202, a public-safety core network 204, hub (PAN master device) 102, local devices (slave devices that serve as smart accessories and/or sensors) 212, a computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art.

Public-safety core network 204 may include one or more packet-switched networks and/or one or more circuit-switched networks, and in general provides one or more public-safety agencies with any necessary computing and communication needs, transmitting any necessary public-safety-related data and communications.

Hub 102 serves as a PAN master device, and may be any suitable computing and communication devices configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information via RANs 202 based on a combination of device 212 inputs. As shown, hub 102 comprises a digital assistant 250 (virtual partner).

In one embodiment of the present invention, a computer-aided dispatch (CAD) incident identifier is utilized to determine if equipment needs to be cleaned/serviced. An incident identification (sometimes referred to as an incident scene identifier, or a CAD incident identifier (CAD ID)) is generated for incidents where an officer is dispatched, or where an officer encounters a public-safety event. This ID could be something as simple as a number, or something as complicated as an identification that is a function of populated fields, one of which may comprise an incident type. So, for example, when a first CAD ID is detected by hub 102, hub 102 may remind its user to clean/service all equipment after the incident has expired. A CAD can also be used to determine the need to clean the PAN devices of the users that were involved in the same incident by detecting that one of the users is cleaning or has cleaned the PAN devices, with the deduction that since those users were at the same incident, and if at least one of the users is cleaning his or her device, that the environment that they together working on are highly susceptible to contamination & most likely other users also should clean their PAN devices.

It should be noted that in FIG. 2 digital assistant 250 is shown existing in hub 102, however, in alternate embodiments of the present invention, digital assistant 250 may exist in any connected PAN device 212. It should also be noted that any one or more of the communication links 218, 224, could include one or more wireless-communication links and/or one or more wired-communication links.

Devices 212 and hub 102 may comprise any device capable of forming a PAN. For example, devices 212 may comprise a gun-draw sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a barometer, speech recognition circuitry, a gunshot detector, . . . , etc.

Finally, computer 214 comprises, or is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214. Computer 214 may also assign an officer to an incident by providing a CAD ID to hub 102.

Figure 3:
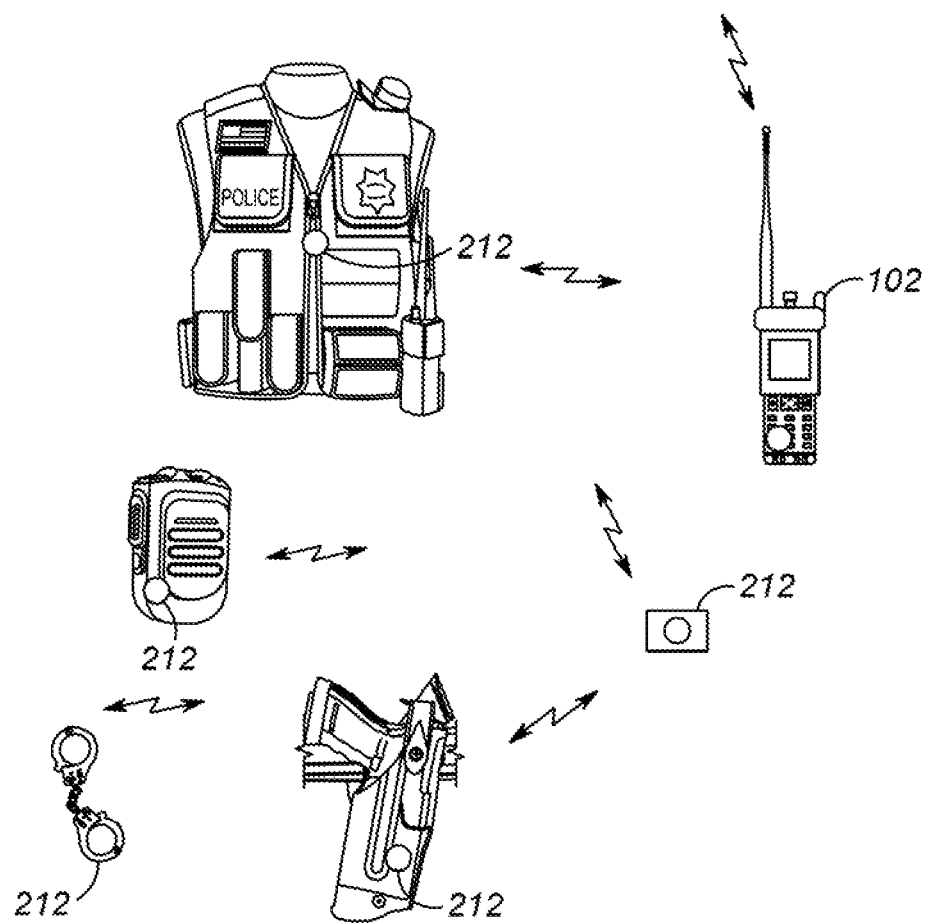
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are shown that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided that attaches to clothing.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

As described above, devices 212 notify hub 102 of a sensed condition by sending a local status alert transmitted from the sensor as a Bluetooth message. Hub 102 in turn, may have a digital assistant provide information to the officer, and/or forward the local status alert over a wide-area network (e.g., RAN/Core Network) to computer 214. In alternate embodiments of the present invention, hub 102 may forward the local status alert to mobile and non-mobile peers (shift supervisor, peers in the field, etc), or to the public via social media. RAN core network preferably comprises a network that utilizes a public-safety over-the-air protocol. Hub 102 may also receive an incident type or assignment from a dispatch center as described above.

As discussed above, a problem exists in that equipment used by first responders often needs to be cleaned or serviced in order to function properly. Oftentimes the amount of equipment on scene will make it difficult to remember to clean and/or service all necessary equipment. In order to address this issue PAN devices will notify a hub when they have been cleaned/serviced, or are in need of a cleaning or servicing. The PAN hub will then notify the user that all devices that are (or were) part of the PAN should be cleaned/serviced. The notification may provide the user with a list of devices that were part of the PAN, or that were part of the PAN for a particular incident (as determined by the CAD).

Because all devices that are part of the PAN experience similar environmental conditions, it can be assumed that if one device needs to be cleaned/serviced, other devices may need cleaning or servicing as well. For example, consider a fireman experiencing the dirty conditions of putting out a large fire. Soot, ash, and smoke may dirty the officer's PAN devices. If the officer cleans one PAN device, the cleaned device will notify the hub. (Note that the cleaned device may indeed be the hub). The hub will then instruct the user to clean all devices that are part of the PAN.

In another embodiment of the present invention, the trigger to notify the need for cleaning/servicing may be an assignment to a particular incident. For example, consider a situation where an officer is assigned to a hazardous waste spill (having a particular CAD ID). It may be assumed that based on the CAD ID, PAN devices may be exposed to hazardous chemicals that require the devices to be cleaned. The hub may notify the user that PAN-member devices need to be serviced based solely on the CAD ID as the trigger. For example, after a particular incident, a notification may be sent to the hub that instructs the hub to clean all devices that were part of the PAN. Alternatively, after a particular incident, and when a PAN device cleaning is detected, the hub may notify the user that all PAN devices should be cleaned. (It should be noted that the term "cleaning" and "servicing" can be used interchangeably, and is intended to mean the performance of routine maintenance or repair work (which includes cleaning) on a PAN device). Alternatively, if one officer is cleaning his PAN devices after an incident, all other officers that has been working on the same incident (detected under same CAD ID) will be notified to clean their devices as well.

With the above in mind,

Hub 102 may determine when hub 102 or another PAN device 212 has been serviced or needs servicing. Hub 102 may notify a user that other PAN devices 212 should be serviced.

Hub 102 may determine that it has been assigned to a particular incident. After the particular incident, hub 102 may notify the user that all PAN devices 212 at the incident should be serviced.

Hub 102 may determine that it had been assigned to a particular incident and a PAN device has been serviced. Based on both the incident and the fact that a PAN device has been serviced, hub 102 may notify the user that other PAN devices need to be serviced.

Hub 102 may determine that it had been assigned to a particular incident and a PAN device has been serviced. Based on both the incident and the fact that a PAN device has been serviced, hub 102 may notify the other users that responded to the same CAD ID that their PAN devices need to be serviced.

If one of sensors 212 comprises an environmental sensor (e.g., a radiation detector, a smoke detector, a sweat detector, . . . , etc.) and gives a notification to hub 102 that an excessive contamination has been detected, hub 102 will notify the user that all PAN devices 212 should be serviced.

Figure 4:
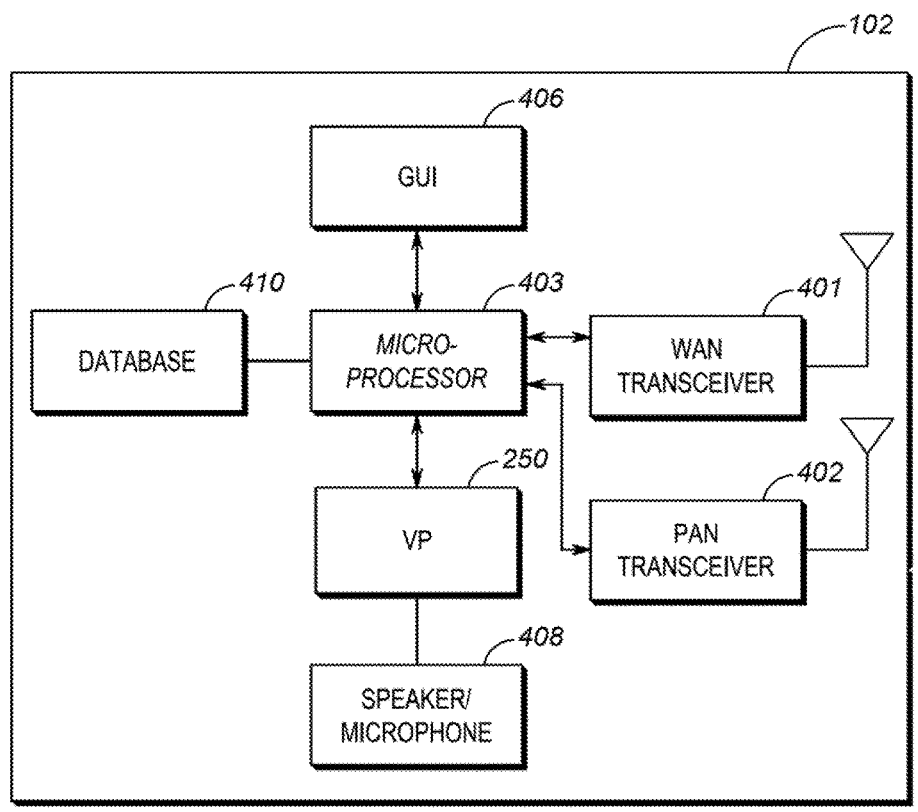
FIG. 4 is a block diagram of a PAN device of FIG. 2.

FIG. 4 is a block diagram of a PAN device. In particular FIG. 4 shows those components (not all necessary) of hub 102 to notify a user that PAN devices 212 should be serviced. As shown, device 212 (which may include hub 102) may include a wide-area-network (WAN) transceiver 401 (e.g., a transceiver that utilizes a public-safety communication-system protocol), PAN transceiver 402 (e.g., a short-range transceiver), GUI 406, logic circuitry 403, speaker 408 and digital assistant 250. In other implementations, device 212 may include more, fewer, or different components. For example, device 212 may be equipped with a sensor (not shown in FIG. 4) that determines that device 212 needs servicing, or has been serviced. Such devices include, but are not limited to a water detector, a contamination detector (e.g, dust, dirt, radiation, . . . , etc.), or any other circuitry that indicates a device needs to be serviced, or has been serviced.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network.

PAN transceiver 402 may be well known short-range (e.g., 30 feet of range) transceivers that utilize any number of network system protocols. For example, PAN transceiver 402 may be configured to utilize Bluetooth communication system protocol for a body-area network, or a private 802.11 network.

GUI 406 comprises provides a way of displaying information and receiving an input from a user. For example, GUI 406 may provide a way of conveying (e.g., displaying) information to a user that PAN devices 212 should be serviced. Part of this information my comprise an image of a list of devices 212. GUI 406 may comprise a touch screen to provide a man/machine interface.

Speaker/microphone 408 provides a mechanism for receiving human voice and providing it to the virtual partner, along with providing audible information generated by the digital assistant (e.g., a voice). In one particular embodiment, a digital assistant may notify a user that PAN devices 212 should be serviced.

Logic circuitry 403 comprises a digital signal processor (DSP), general purpose microprocessor, a programmable logic device, or application specific integrated circuit (ASIC) and is configured to notify a user that PAN devices 212 should be serviced.

Finally, database 110 is provided. Database 410 comprises standard memory (such as RAM, ROM, . . . , etc) and serves to store PAN member names (identifications) along with associated CAD incident identifiers. So, for example, database 410 may comprise a list of PAN members that formed a PAN during a particular incident. Alternatively, database 410 may simply store a list of current PAN members without any particular incident ID.

Figure 5:
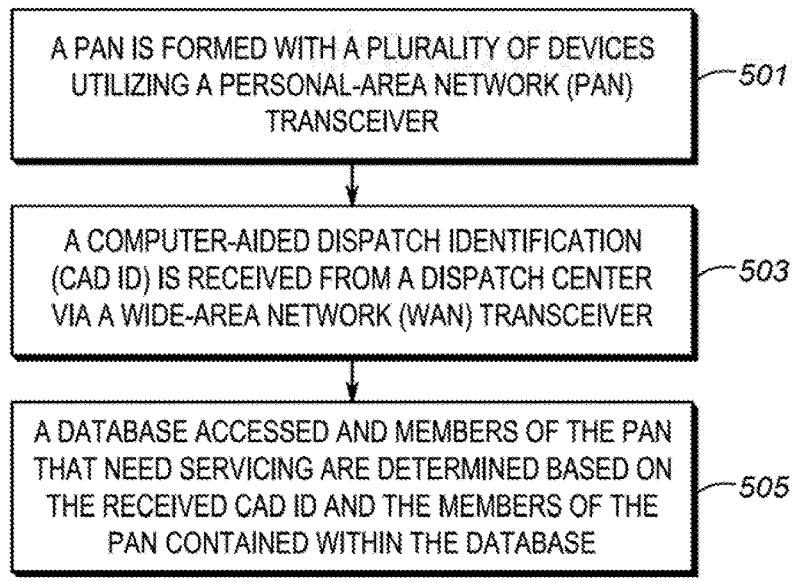
FIG. 5 is a flow chart showing operation of the device of FIG. 4 in accordance with a first embodiment of the present invention.

FIG. 5 is a flow chart showing operation of the device of FIG. 4 during a first embodiment of the present invention. The logic flow begins at step 501 where a PAN is formed with a plurality of devices utilizing a personal-area network (PAN) transceiver. At step 503 a computer-aided dispatch identification (CAD ID) is received from a dispatch center via a wide-area network (WAN) transceiver. At step 505 a database accessed and members of the PAN that need servicing are determined based on the received CAD ID and the members of the PAN contained within the database.

The above logic flow provides for an apparatus having a personal-area network (PAN) transceiver forming a PAN with a plurality of devices, a wide-area network (WAN) transceiver receiving a computer-aided dispatch identification (CAD ID) from a dispatch center, a database comprising members of the PAN, and logic circuitry accessing the database and determining members of the PAN that need servicing based on the received CAD ID and the members of the PAN contained within the database.

As discussed above, the members of the PAN that need servicing comprises devices that currently form the PAN, or comprises devices that formed the PAN during a particular incident identified by the CAD ID.

A graphical-user interface may be provided for displaying a notification of the PAN devices that need servicing, and/or a digital assistant may be provided for notifying a user of the PAN devices that need servicing.

As discussed above, the PAN transceiver may receive an indication that a PAN device has been serviced or is in need of servicing, and wherein the PAN devices that need servicing are additionally based on the received indication.

Figure 6:
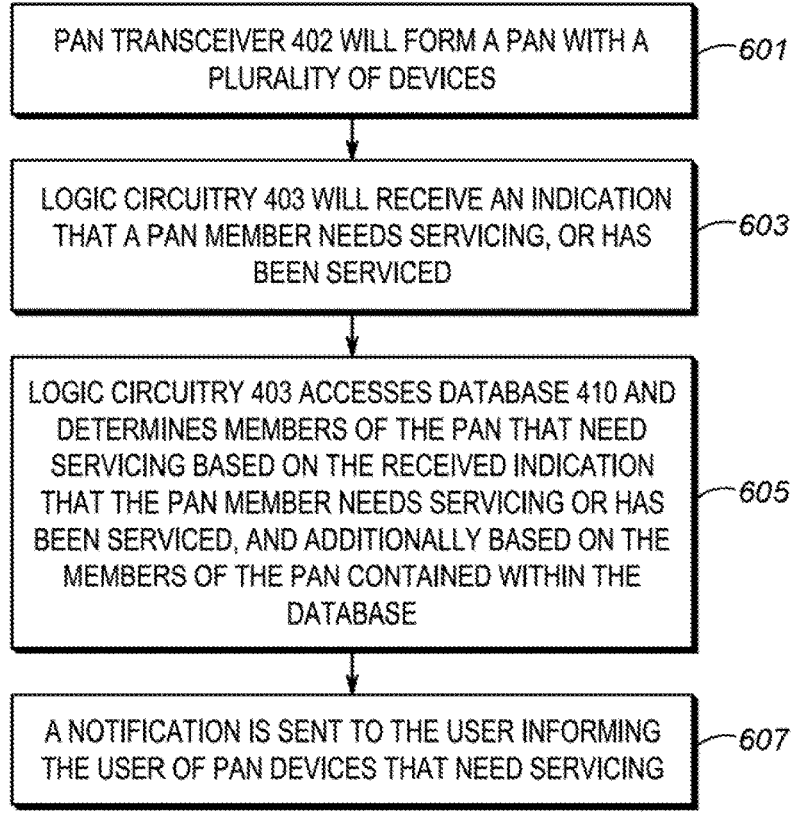
FIG. 6 is a flow chart showing operation of the device of FIG. 4 in accordance with a second embodiment of the present invention.

FIG. 6 is a flow chart showing operation of the device of FIG. 4 during a second embodiment of the present invention. During operation, PAN transceiver 402 will form a PAN with a plurality of devices (step 601). Logic circuitry 403 will receive an indication that a PAN member needs servicing, or has been serviced (step 603). As discussed above, this determination may comprise the step of determining that device 102 has been assigned to a particular incident, determining that a PAN member has been serviced, determining that a sensor 212 indicates it should be serviced, or any combination of the above.

As discussed above, since PAN members communicate to each other through short-range communications, the indication that a PAN member needs servicing, or has been serviced may be received at PAN transceiver 402, transmitted from the PAN member that has been serviced, or needs servicing.

Alternatively, if the determination that servicing is needed is based on a particular assignment for an officer, the determination that a PAN member needs servicing may be received via WAN transceiver from the public-safety dispatch center's assignment of a particular CAD ID to device 102. For example, if device 102 has been assigned to a particular incident, it may be "assumed" by logic circuitry 403 that servicing of PAN members needs to occur. This information may be stored in database 410. More particularly, database 410 may comprise a list of CAD IDs that require servicing of PAN members.

After logic circuitry 403 determines that a PAN member needs servicing or has been serviced, logic circuitry 403 accesses database 410 and determines members of the PAN that need servicing based on the received indication that the PAN member needs servicing or has been serviced, and additionally based on the members of the PAN contained within the database (step 605). As discussed above, the list of PAN devices that should be serviced preferably comprises:

those devices that currently form a PAN with device 102; or those devices that formed a PAN with device 102 during a particular incident; or any subset of PAN devices determined as described above (not all devices in the PAN may require servicing). The subset of PAN devices that need to be clean may be determined by the type/model of devices or worn position of the devices (devices that is worn near to the first PAN device that is cleaned is likely need to be clean as well).

At step 607 a notification is sent to the user informing the user of PAN devices that need servicing. For example, logic circuitry 403 may provide this information to VP 250, which may notify the user via speaker 408. Alternatively, or concurrently, this information may be displayed on GUI 406.

The above logic flow provides for an apparatus comprising a personal-area network (PAN) transceiver forming a PAN with a plurality of devices and receiving an indication that a PAN member needs servicing or has been serviced, a database comprising members of the PAN, and logic circuitry accessing the database and determining members of the PAN that need servicing based on the received indication that the PAN member needs servicing or has been serviced, and additionally based on the members of the PAN contained within the database. Circuitry can also be provided to notify a user of the members of the PAN that need servicing.

As described above, the indication comprises a notification from a PAN sensor that excessive contamination has been detected or that a notification is detected from a PAN member that it has been serviced or is in need of servicing.

As discussed, the members of the PAN that need servicing may comprise devices that currently form the PAN.

Finally, the database may comprise a particular computer-aided dispatch incident identification (CAD ID) and devices that were PAN members during the incident identified by the CAD ID, and wherein members of the PAN that need servicing comprises devices that were PAN members during the incident identified by the CAD ID.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising: a personal-area network (PAN) transceiver configured to form a PAN with a plurality of sensors and/or accessories by communicating with the plurality of sensors and/or accessories, wherein the communication utilizes a short-range wireless communication system protocol; a wide-area network (WAN) transceiver configured to receive a computer-aided dispatch identification (CAD ID) from a dispatch center, wherein the CAD ID identifies a public-safety incident; a database comprising identifications of the smart sensors and/or accessories that were members of the PAN during the public-safety incident; and logic circuitry configured to access the database and determine the sensors and/or accessories that need cleaning, wherein the sensors and/or accessories that need cleaning comprise the sensors and/or accessories that formed the PAN during the public-safety incident, wherein the PAN transceiver is configured to receive an indication that a PAN device has been cleaned or is in need of cleaning.

2. The apparatus of claim 1 further comprising a graphical-user interface configured to display a notification of PAN sensors and/or accessories that need cleaning.

3. The apparatus of claim 1 further comprising a digital assistant configured to notify a user of PAN sensors and/or accessories that need cleaning.

4. The apparatus of claim 1 wherein the PAN sensors and/or accessories that need cleaning are additionally based on the received indication.

5. A method comprising the steps of: forming a PAN by communicating with a plurality of sensors and/or accessories utilizing a personal-area network (PAN) transceiver, wherein the communication utilizes a short-range wireless communication system protocol; receiving a computer-aided dispatch identification (CAD ID) from a dispatch center via a wide-area network (WAN) transceiver, wherein the CAD ID identifies a public-safety incident; and accessing a database comprising identifications of the smart sensors and/or accessories that were members of the PAN during the public-safety incident; and determining smart sensors and/or accessories that need cleaning, wherein the sensors and/or accessories that need cleaning comprise the sensors and/or accessories that formed the PAN during the public-safety incident, wherein the CAD ID comprises an identification of a fire, and the sensors and/or accessories that for the PAN were at the fire.

6. An apparatus comprising:

a personal-area network (PAN) transceiver configured to form a PAN with a plurality of sensors and/or accessories by communicating with the plurality of sensors and/or accessories, wherein the communication utilizes a short-range wireless communication system protocol;

a wide-area network (WAN) transceiver configured to receive a computer-aided dispatch identification (CAD ID) from a dispatch center that identifies a public-safety event comprising a fire;

a database comprising identifications of the smart sensors and/or accessories that were members of the PAN during the fire; and logic circuitry configured to access the database and determine the sensors and/or accessories that need cleaning, wherein the sensors and/or accessories that need cleaning comprise the sensors and/or accessories that formed the PAN during the fire.

* * * * *